US011384978B2

(12) United States Patent
Bai et al.

(10) Patent No.: US 11,384,978 B2
(45) Date of Patent: Jul. 12, 2022

(54) HOUSEHOLD APPLIANCE

(71) Applicant: BSH HAUSGERAETE GMBH, Munich (DE)

(72) Inventors: Jiafeng Bai, Chuzhou (CN); Liang Li, Chuzhou (CN); Junxin Liu, Chuzhou (CN); Tianming Yu, Chuzhou (CN)

(73) Assignee: BSH Hausgeraete GmbH, Munich (DE)

( * ) Notice: Subject to any disclaimer, the term of this patent is extended or adjusted under 35 U.S.C. 154(b) by 64 days.

(21) Appl. No.: 16/846,635

(22) Filed: Apr. 13, 2020

(65) Prior Publication Data
US 2020/0340738 A1 Oct. 29, 2020

(30) Foreign Application Priority Data

Apr. 12, 2019 (CN) .......................... 201910292416.8

(51) Int. Cl.
| | | |
|---|---|---|
| F25D 25/02 | (2006.01) | |
| F16L 3/01 | (2006.01) | |
| A47B 88/40 | (2017.01) | |
| F25D 23/02 | (2006.01) | |

(52) U.S. Cl.
CPC ............ *F25D 25/025* (2013.01); *A47B 88/40* (2017.01); *F16L 3/01* (2013.01); *F25D 23/021* (2013.01); *F25D 2325/00* (2013.01)

(58) Field of Classification Search
CPC ..... F25D 25/025; F25D 23/021; A47B 88/40; F16L 3/01
USPC .............................................. 312/334.1, 331
See application file for complete search history.

(56) References Cited

U.S. PATENT DOCUMENTS

| | | | | |
|---|---|---|---|---|
| 8,291,816 | B2 * | 10/2012 | Iwamoto ................. | A47J 39/00 99/467 |
| 9,585,474 | B2 * | 3/2017 | Haltmeyer ............ | F25D 23/067 |
| 2008/0309211 | A1 * | 12/2008 | Wilson .................... | F24C 15/02 312/410 |
| 2011/0005264 | A1 * | 1/2011 | Lee ........................ | F25D 25/025 62/449 |
| 2011/0050065 | A1 * | 3/2011 | Lee ........................ | F25D 23/028 312/402 |
| 2011/0146333 | A1 * | 6/2011 | Koo ....................... | F25D 31/005 62/441 |
| 2011/0181163 | A1 * | 7/2011 | Han ........................ | F25D 11/00 312/405 |

* cited by examiner

*Primary Examiner* — James O Hansen
(74) *Attorney, Agent, or Firm* — Laurence A. Greenberg; Werner H. Stemer; Ralph E. Locher

(57) ABSTRACT

A household appliance has a main body, a chamber with an opening, and a drawer door closing the chamber. A support mechanism is connected between the drawer door and the main body. A cable extends between the main body and the drawer door and a guidance mechanism guides the cable and moves with the drawer door. The guidance mechanism includes a bendable member that moves along a moving path including a bent portion. A limiting mechanism limits the bendable member to move within the moving path and a preset error range. A structure of a component surrounding the guidance mechanism in the household appliance is improved, so that a moving track of the guidance mechanism can be guided and limited when the guidance mechanism moves as the drawer door moves. This helps the guidance mechanism and the cable move through an expected track.

16 Claims, 10 Drawing Sheets

HOUSEHOLD APPLIANCE

CROSS-REFERENCE TO RELATED APPLICATION

This application claims the priority, under 35 U.S.C. § 119, of Chinese patent application CN 201910292416, filed Apr. 12, 2019; the prior application is herewith incorporated by reference in its entirety.

BACKGROUND OF THE INVENTION

Field of the Invention

The present invention relates to the field of household appliance technologies, and specifically, to a household appliance.

With application and popularization of concepts of smart home and digital household appliances, more electronic and electrical components are applied to a household appliance. Moreover, a new form requirement is proposed for an electrical connection between various electronic and electrical components applied to the household appliance.

A refrigerator is used as an example. Generally, existing moving components such as a drawer of the refrigerator are electrically connected to stationary components such as a body of the refrigerator by using a drag chain structure and electrical wires internally threaded through the refrigerator. However, an implementation of the existing drag chain structure is complex, and a quantity of components is relatively large. This certainly increases complexity of the refrigerator, and production and assembly are relatively time-consuming.

In addition, in an existing scenario in which the drag chain structure is applied to the refrigerator, due to a space limitation in a chamber of the refrigerator, the drag chain may easily collide with a surrounding component. Consequently, the drag chain deviates from an expected moving track, causing mechanical failure of the drag chain and negatively impacting the service life of the component.

BRIEF SUMMARY OF THE INVENTION

It is accordingly an object of the invention to provide a household appliance, which overcomes the above-mentioned and other disadvantages of the heretofore-known devices and methods of this general type and which provides, in simple terms, for improved household appliance.

With the above and other objects in view there is provided, in accordance with the invention, a household appliance, comprising:

a main body formed with a chamber having an opening;

a drawer door configured to selectively close or open said chamber;

a support mechanism, connected between said drawer door and said main body and movably connecting said drawer door to said main body;

a cable extending between said main body and said drawer door;

a guidance mechanism configured to guide said cable, said guidance mechanism being configured to move with said drawer door and including a bendable member, said bendable member being configured to move along a moving path having a bent portion; and a limiting mechanism configured to limit said bendable member to move within the moving path and a preset error range.

Therefore, the present invention provides a household appliance, including: a main body, including a chamber with an opening; a drawer door ("drawer-type door" in the following) configured to close or open the chamber; a support mechanism, connected between the drawer-type door and the main body, so that the drawer-type door is movably connected to the main body; a cable, where the cable is led from the main body to the drawer-type door; a guidance mechanism configured to guide the cable, where the guidance mechanism is adapted to move with the drawer-type door, the guidance mechanism includes a bendable member, and the bendable member is adapted to move along a moving path including a bent portion; and a limiting mechanism, configured to limit the bendable member to move within the moving path and a preset error range.

In the solution provided by the present invention, a structure of a component surrounding the guidance mechanism in the household appliance is improved, for example, the limiting mechanism is added, so that a moving track of the guidance mechanism can be guided and limited when the guidance mechanism moves as the drawer-type door moves. This helps the guidance mechanism and the cable move along an expected track, so as to achieve an actual design effect and an expected service life.

Optionally, the limiting mechanism is fixedly secured in the chamber, to provide better limiting and guidance effects, and prevent the limiting mechanism from moving as the guidance mechanism moves.

Optionally, the limiting mechanism includes a projecting rib. The projecting rib protrudes from a bottom wall of the chamber, and extends along the moving path. Therefore, the bendable member may be guided and limited in the moving path by using an existing component of the household appliance and finely adjusting a location of the projecting rib in the chamber.

Optionally, the household appliance further includes a cable housing. The cable housing is connected to a wall of the chamber, and the cable is led out from the cable housing. The limiting mechanism includes a limiting bar extending backward from the cable housing along the moving path. Therefore, the bendable member may be guided and limited in the moving path by using an existing component of the household appliance and improving a structure of the cable housing through addition of the limiting bar.

Optionally, the limiting mechanism includes a limiting member connected to the support mechanism. Therefore, the bendable member is guided and limited in the moving path by adding the limiting member to the support mechanism. Moreover, a manner in which the limiting member is disposed on the support mechanism helps reduce assembly complexity, so that there is no need to open another hole in an inner wall of the chamber, so as to avoid damage to the interior of the chamber.

Optionally, the support mechanism includes a fixed rail fixedly secured on the main body, and the limiting member is connected to the fixed rail. Therefore, when the guidance mechanism moves as the drawer-type door moves, the limiting member secured on the fixed rail may continuously and effectively implement functions of guiding and limiting.

Optionally, the limiting member is located between the fixed rail and the wall of the chamber, to rationally use a space structure in the chamber.

Optionally, the limiting member includes: a mounting portion, secured on a side of the fixed rail that is close to an inner wall of the chamber; and a stop portion, having an included angle of a preset angle with the mounting portion. The stop portion has a first end and a second end opposite to each other, the first end is connected to the mounting portion, and the second end extends in a direction that is away from the inner wall of the chamber. Therefore, the limiting member is firmly secured on the fixed rail of the support mechanism by using the mounting portion, so that the bendable member is guided and limited in the moving path by using the stop portion. Further, through coordination of the mounting portion and the stop portion, it can effectively avoid that limiting and guiding effects are affected because the limiting member moves as the bendable member moves during limiting and guiding.

Optionally, the limiting mechanism includes: a first limiting portion, configured to limit deviation of the bendable member from the moving path in a width direction of the chamber when the bendable member moves; and/or a second limiting portion, configured to limit deviation of the bendable member from the moving path in a height direction of the chamber when the bendable member moves. Therefore, through limiting and guiding of the first limiting portion and/or the second limiting portion, the bendable member can be limited to move within the moving path and a preset error range in the width direction and the height direction in an omnidirectional manner.

Optionally, the household appliance further includes a cable exit portion, and the cable exit portion is located on a side wall of the chamber. The moving path includes a first path extending backward from the cable exit portion, a second path spaced at an interval with the first path in the height direction of the chamber, and the bent portion connecting the first path to the second path. The first path is parallel to the second path. The limiting mechanism includes a first limiting portion extending along the first path and/or a second limiting portion extending along the second path. Therefore, when the guidance mechanism moves as the drawer-type door moves, the bendable member can be limited and guided to move along the first path through limiting and guiding of the first limiting portion, and the bendable member can be limited and guided to move along the second path through limiting and guiding of the second limiting portion.

Optionally, the first limiting portion and the first path are distributed in parallel in a width direction of the chamber, so that a moving track of the bendable member in the width direction of the chamber is limited and guided.

Optionally, in the height direction of the chamber, the second limiting portion is located above the second path, so that a moving track of the bendable member in the height direction of the chamber is limited and guided.

Optionally, the cable exit portion includes a cable housing. The cable is led out from the cable housing, and the first limiting portion extends backward from the cable housing. Therefore, the bendable member may be limited and guided to move along the first path by using an existing component of the household appliance and improving a structure of the cable housing through addition of the first limiting portion.

Optionally, the first limiting portion is strip-shaped, and a length of the first limiting portion along the first path is not less than a half length of the first path, to ensure that the bendable member can be continuously guided and limited when moving with the drawer-type door.

Optionally, the first limiting portion includes a projecting rib located on a bottom wall of the chamber, and the projecting rib extends along the first path. Therefore, the bendable member may be limited and guided to move along the first path by using an existing component of the household appliance and finely adjusting a location of the projecting rib in the chamber.

Optionally, the support mechanism includes a fixed rail secured on the main body, and the second limiting portion is connected to the fixed rail. Therefore, when the guidance mechanism moves as the drawer-type door moves, the second limiting portion secured on the fixed rail may continuously and effectively implement functions of guiding and limiting.

Optionally, the second limiting portion is located between the fixed rail and a wall of the chamber, to rationally use a space structure in the chamber.

Optionally, the bendable member includes a chain, to enable the bendable member and the cable accommodated in the bendable member to flexibly move by using the bent portion.

With the above and other objects in view there is also provided, in accordance with a further embodiment of the present invention, a household appliance, including: a main body, including a chamber with an opening; a drawer-type door configured to close or open the chamber; a support mechanism, connected between the drawer-type door and the main body, so that the drawer-type door is movably connected to the main body; a cable, where the cable is led from the main body to the drawer-type door, to guide a chain of the cable; and a limiting member, where the limiting member is connected to the support mechanism, and the limiting member is configured to limit a moving range of the chain. Therefore, when the chain moves with the drawer-type door, a moving range of the chain in a height direction of the chamber is limited by adding the limiting member to the support mechanism. Moreover, a manner in which the limiting member is disposed on the support mechanism helps reduce assembly complexity, so that there is no need to open another hole in an inner wall of the chamber, so as to avoid damage to the interior of the chamber.

Optionally, the support mechanism includes a fixed rail fixedly secured on the main body, and the limiting member is connected to the fixed rail. Therefore, when the chain moves with the drawer-type door, the limiting member secured on the fixed rail may continuously and effectively implement functions of guiding and limiting.

Optionally, the household appliance includes a self-closing unit secured on the fixed rail, and the limiting member is located in front of the self-closing unit. Therefore, based on original mounting locations of existing components in the chamber, space in the chamber is rationally used to design a mounting location of the limiting member, so as to obtain both artistic and guiding effects.

Optionally, the limiting member includes: a mounting portion, secured on a side of the fixed rail that is close to an inner wall of the chamber; and a stop portion, having an included angle of a preset angle with the mounting portion. The stop portion has a first end and a second end opposite to each other, the first end is connected to the mounting portion, and the second end extends in a direction that is away from the inner wall of the chamber. Therefore, the limiting member is firmly secured on the fixed rail of the support mechanism by using the mounting portion, so that the chain is guided and limited in the moving path by using the stop portion. Further, through coordination of the mounting portion and the stop portion, it can effectively avoid that limiting and guiding effects are affected because the limiting member moves with the chain when limited and guided.

An embodiment of the present invention further provides a household appliance, including: a main body, including a chamber with an opening; a drawer-type door configured to close or open the chamber; a support mechanism, connected between the drawer-type door and the main body, so that the drawer-type door is movably connected to the main body; and a cable, where the cable is led from a cable housing of the main body to the drawer-type door, to guide a chain of the cable. The cable housing includes a guiding portion, and the guiding portion extends along the chain. Therefore, when the chain moves with the drawer-type door, a moving range of the chain in a width direction of the chamber may be limited by using an existing component of the household appliance and improving a structure of the cable housing through addition of the guiding portion.

An embodiment of the present invention further provides a household appliance, including: a main body, including a chamber with an opening; a drawer-type door configured to close or open the chamber; a support mechanism, connected between the drawer-type door and the main body, so that the drawer-type door is movably connected to the main body; and a cable, where the cable is led from a cable housing of the main body to the drawer-type door, to guide a chain of the cable. An inner wall of the chamber includes a projecting portion that is close to the chain, and the projecting portion extends along the chain. Therefore, when the chain moves with the drawer-type door, a moving range of the chain in a width direction of the chamber may be limited by using the projecting portion.

Other features which are considered as characteristic for the invention are set forth in the appended claims.

Although the invention is illustrated and described herein as embodied in household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

As described in the related art, to supply electricity for electronic and electrical components on a drawer-type door, in an existing household appliance, a cable needs to be led out from a chamber, and connected to the drawer-type door. To protect the cable, in the prior art, the cable arranged in the chamber is usually guided by using a drag chain structure.

In addition, the drawer-type door is movable relative to a main body of the household appliance, to open or close a drawer. Therefore, a drag chain disposed in the chamber may also move as the drawer-type door moves.

However, due to a space limitation in the chamber, the drag chain is easy to have a collision with a surrounding component. Consequently, the drag chain deviates from an expected moving track, causing mechanical failure of the drag chain and affecting a service life of the component.

To resolve the above technical problem, embodiments of the present invention provide a household appliance, including: a main body, including a chamber with an opening; a drawer-type door configured to close or open the chamber; a support mechanism, connected between the drawer-type door and the main body, so that the drawer-type door is movably connected to the main body; a cable, where the cable is led from the main body to the drawer-type door; a guidance mechanism configured to guide the cable, where the guidance mechanism is adapted to move with the drawer-type door, the guidance mechanism includes a bendable member, and the bendable member is adapted to move along a moving path including a bent portion; and a limiting mechanism, configured to limit the bendable member to move within the moving path and a preset error range.

In the solution provided by the present invention, a structure of a component surrounding the guidance mechanism in the household appliance is improved, for example, the limiting mechanism is added, so that a moving track of the guidance mechanism can be guided and limited when the guidance mechanism moves as the drawer-type door moves. This helps the guidance mechanism and the cable move along an expected track, so as to achieve an actual design effect and an expected service life.

To make the foregoing objectives, features, and advantages of the present invention clearer and more comprehensible, the following describes specific embodiments of the present invention in detail with reference to the accompanying drawings.

Figure 1:
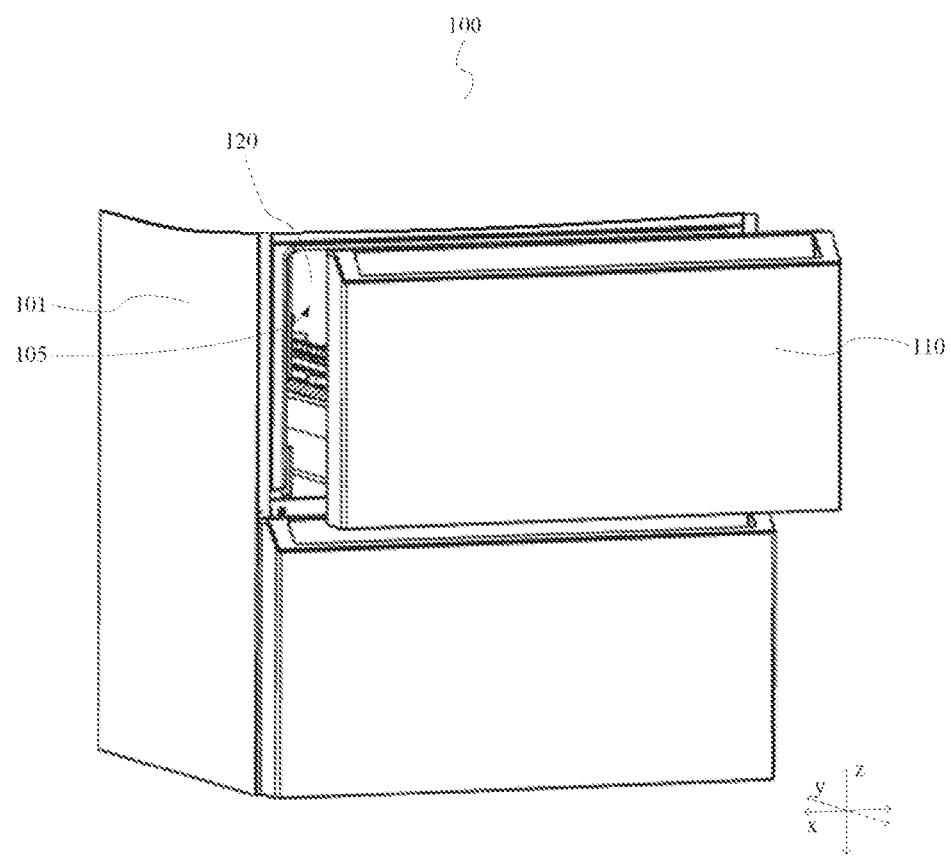
FIG. 1 is a schematic diagram of a household appliance according to an embodiment of the present invention.
Figure 2:
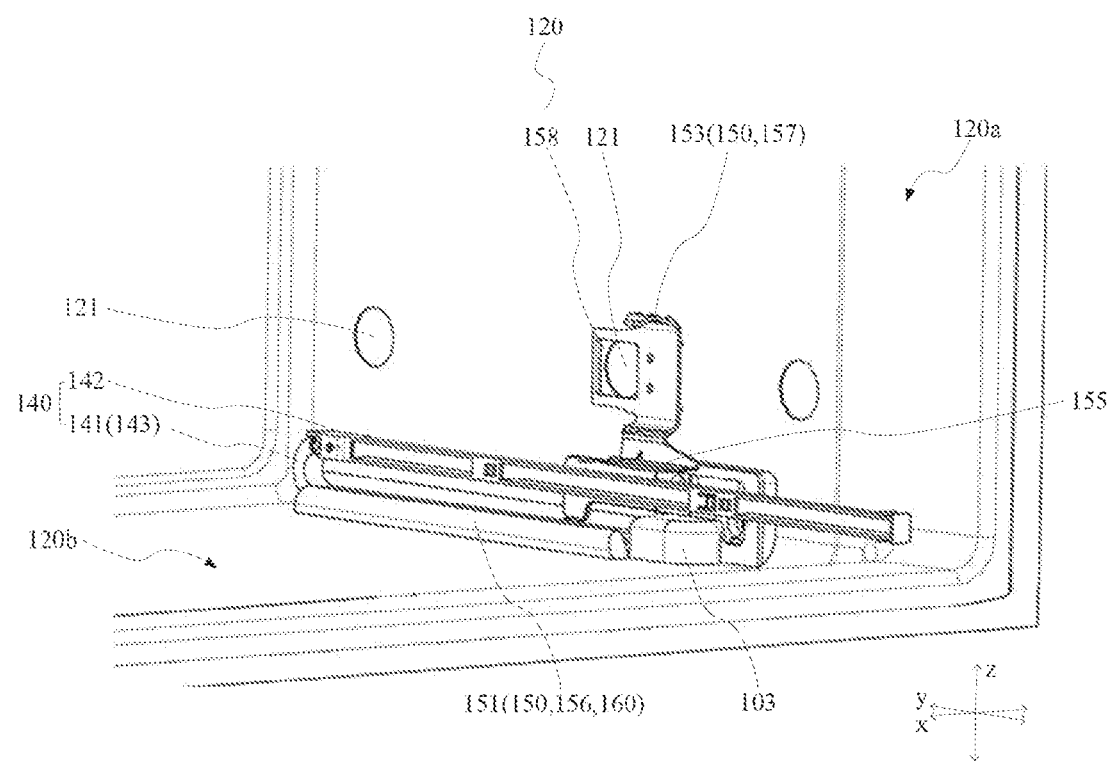
FIG. 2 is a schematic diagram of a combination of a guidance mechanism in a chamber shown in FIG. 1.
Figure 3:
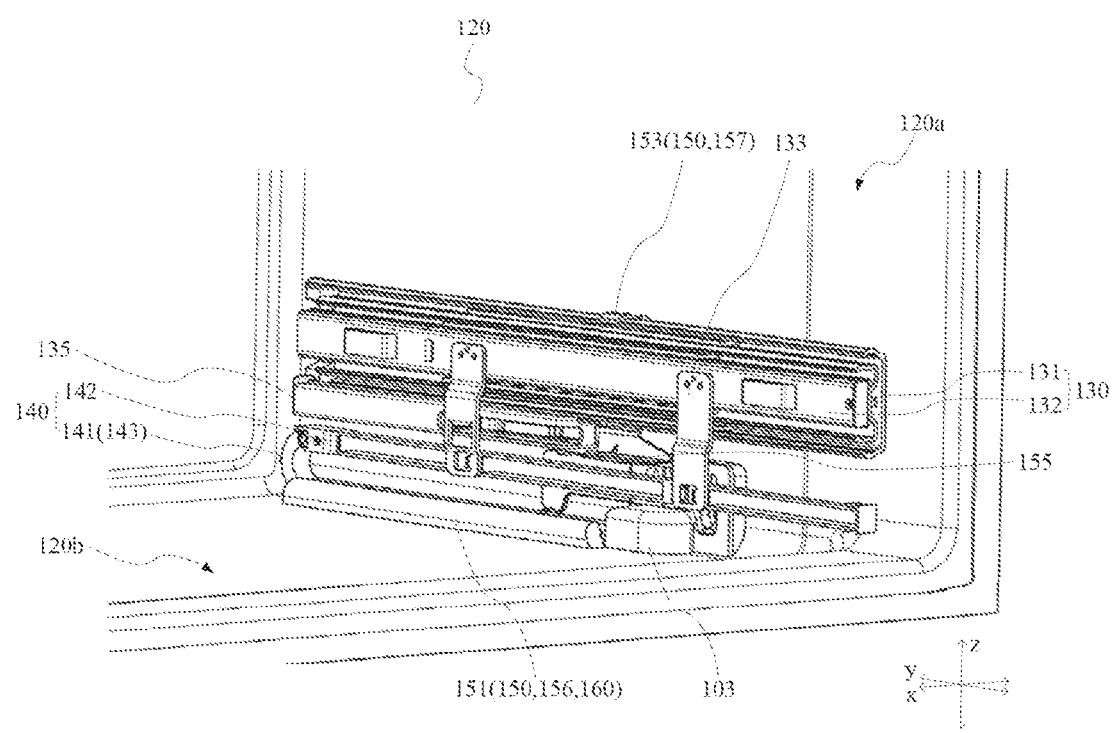
FIG. 3 is a schematic diagram of a combination of a support mechanism in a chamber shown in FIG. 2.

Referring now to the figures of the drawing in detail and first, particularly, to FIG. 1 thereof, there is shown a schematic diagram of a household appliance according to an embodiment of the present invention. FIG. 2 is a schematic diagram of a combination of a guidance mechanism in a chamber shown in FIG. 1. FIG. 3 is a schematic diagram of a combination of a support mechanism in a chamber shown in FIG. 2. FIG. 1 shows only an example of a structure of a region in which a drawer-type door 110 of a household appliance 100 is located. Both FIG. 2 and FIG. 3 show only a partial region of a chamber 120, and do not show the drawer-type door 110 configured to open or close the region.

For ease of description, it is assumed that a width direction of the household appliance 100 is an x direction, a depth direction of the household appliance 100 is a y direction, and a height direction of the household appliance 100 is a z direction.

The household appliance 100 in this embodiment may include a refrigerating device such as a refrigerator or a freezer. The household appliance 100 may further include another electrically powered device that includes more than two components that are movable opposite to each other and in which a component needs to supply electricity for another component.

Specifically, referring to FIG. 1 to FIG. 3, the household appliance 100 in this embodiment may include: a main body 101, including the chamber 120 with an opening 105; and the drawer-type door 110 configured to open or close the chamber 120.

More specifically, the household appliance 100 may further include a support mechanism 130, connected between the drawer-type door 110 and the main body 101, so that the drawer-type door 110 is movably connected to the main body 101.

Figure 4:
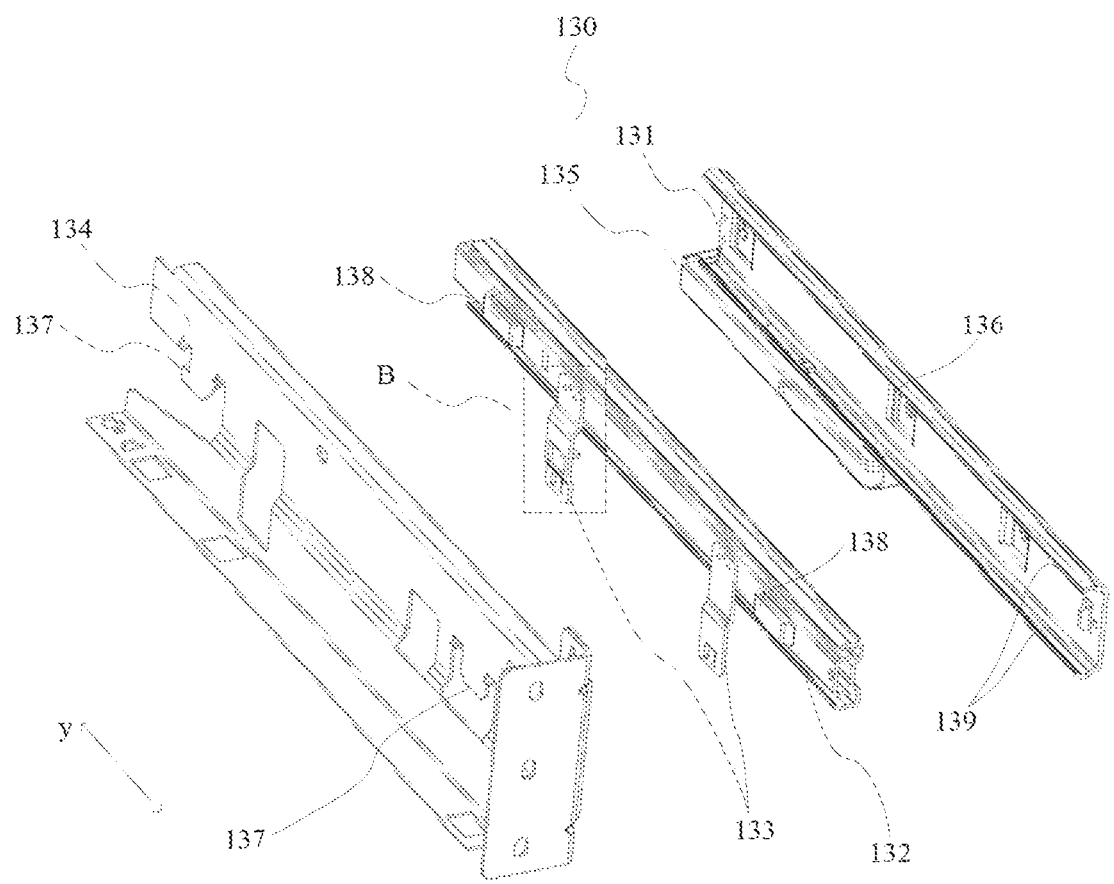
FIG. 4 is an exploded view of a support mechanism.

In an embodiment, referring to FIG. 1 and FIG. 4, the drawer-type door 110 is a door structure, and a side of the drawer-type door 110 facing the chamber 120 is connected to the support mechanism 130. The support mechanism 130 is further connected to a side wall 120a of the chamber 120. Therefore, through support and guiding of the support mechanism 130, the drawer-type door 110 may move in the y direction or a reverse direction of the y direction, to open or close the chamber 120. Further, a stored object may be directly placed in the chamber 120.

In a variant, the drawer-type door 110 may be connected to a drawer (not shown in the figure), the chamber 120 is adapted to accommodate the drawer, and the support mechanism 130 is adapted to connect a side wall of the drawer to a side wall 120a of the chamber 120. Therefore, through support and guiding of the support mechanism 130, the drawer-type door 110 and the drawer may move together in the y direction or a reverse direction of the y direction by dragging or pushing the drawer-type door 110, to open or close the chamber 120. When the chamber 120 is open, the drawer moves in the reverse direction of the y direction with the drawer-type door 110 and is exposed in an outside environment. When the chamber 120 is closed, the drawer moves in the y direction with the drawer-type door 110 and is isolated from the outside environment, so as to implement a closed effect. Further, a stored object may be placed in the drawer.

Figure 5:
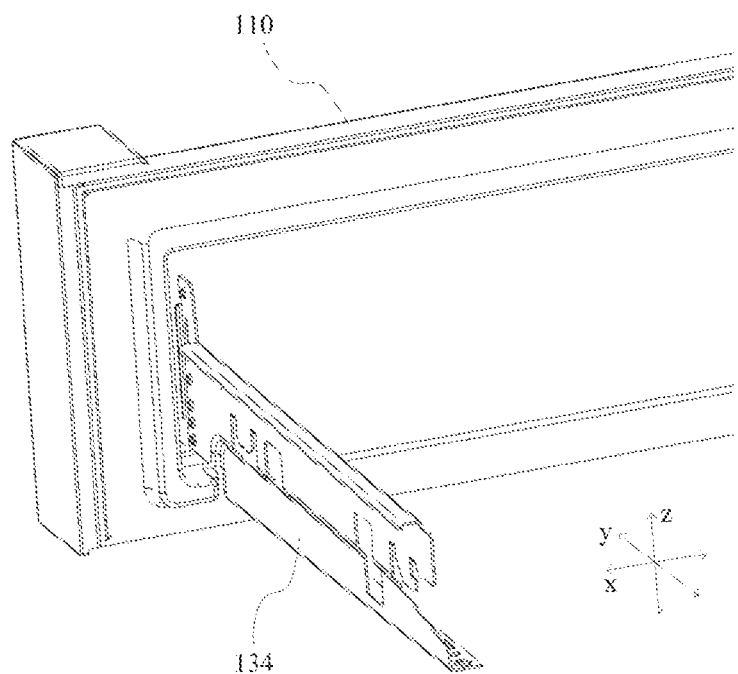
FIG. 5 is a schematic diagram of a combination of a drawer and a support mechanism shown in FIG. 1.

In an embodiment, referring to FIG. 4 and FIG. 5, the support mechanism 130 may be a slide rail including a fixed rail 131, a movable rail 132, and a support frame 134. The fixed rail 131 is fixedly secured on the main body 101. The support frame 134 is connected to the side of the drawer-type door 110 facing the chamber 120. The movable rail 132 is adapted to movably connect the fixed rail 131 to the support frame 134, to enable the drawer-type door 110 to be supported on the side wall 120a of the chamber 120, and movable relative to the chamber 120.

Specifically, referring to FIG. 2, the side wall 120a of the chamber 120 may be provided with a fixing hole 121, and the fixed rail 131 may be provided with a via 136 at a corresponding location. The fixed rail 131 is secured on the side wall 120a of the chamber 120 by using a screw or the like.

Further, after the fixed rail 131, the movable rail 132, and the support frame 134 are assembled, a hook structure 133 may be exposed through a relief hole on the support frame 134, so as to be connected to a rigid component 142 of the guidance mechanism 140, so that the guidance mechanism 140 can move as the support frame 134 and the movable rail 132 move.

Further, a hook portion 137 is disposed on the support frame 134, and an adaptive portion 138 is disposed on a side of the movable rail 132 that is close to the support frame 134. During assembly, the hook portion 137 is coupled to the adaptive portion 138, to enable the movable rail 132 to synchronously move with the support frame 134.

Further, rails 139 are disposed on upper and lower sides of the fixed rail 131 in the y direction. The rails 139 are adapted to accommodate the movable rail 132, to enable the movable rail 132 and the support frame 134 secured on the movable rail 132 to move on the rails 139 of the fixed rail 131 in the y direction and the reverse direction of the y direction, so that the drawer-type door 110 can open or close the chamber 120. The movable rail 132 may also be referred to as a scalable guide rail.

Further, referring to FIG. 5 again, on a plane formed in the x direction and the y direction, the support frame 134 may be L-shaped. A short side of the L-shaped structure is secured on the side of the drawer-type door 110 facing the chamber 120 by using a screw, and a long side of the L-shaped structure is adapted to connect to the movable rail 132. For simplicity, FIG. 5 shows only a combined part of the drawer-type door 110 and the support frame 134.

Alternatively, when the drawer-type door 110 is adapted to support the drawer, the support frame 134 may be secured on a side wall of the drawer.

Further, on a plane formed in the x direction and the z direction, the support frame 134 may also be L-shaped, and a short side part may be adapted to support a bottom of the drawer.

Further, a self-closing unit 135 may be connected below the fixed rail 131, so that when the drawer-type door 110 is pushed back to the chamber 120 to an extent in the y direction, even if there is no external force that is applied to the drawer-type door 110 in the y direction, the remaining stroke in the y direction may still be completed through coordination of the self-closing unit 135 and the movable rail 132, to enable the drawer-type door 110 to fully close the chamber 120.

Figure 11:
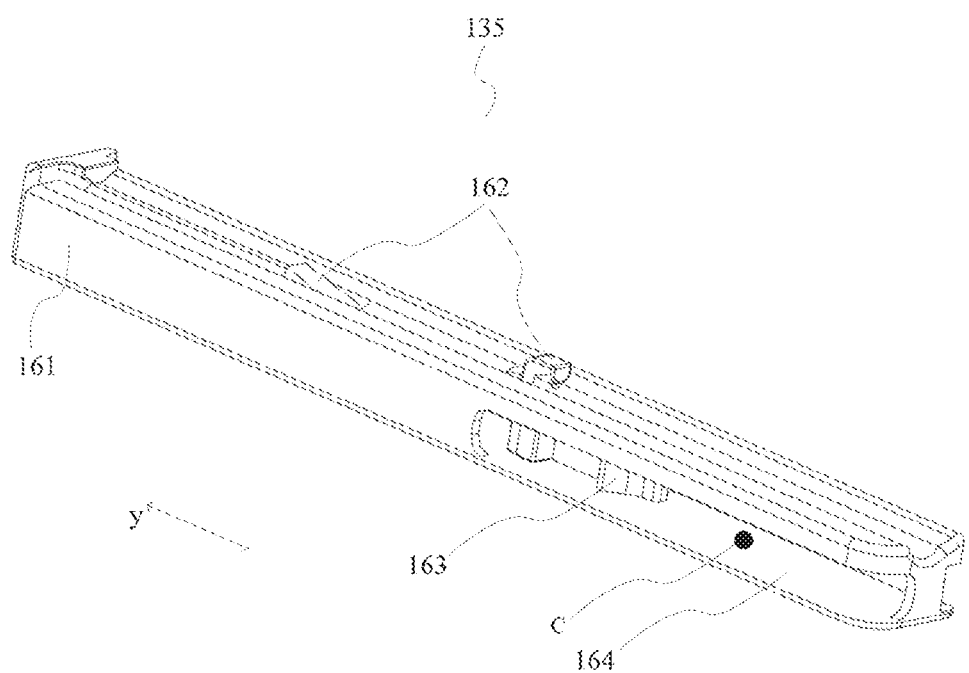
FIG. 11 is a schematic diagram of a self-closing unit shown in FIG. 3.

For example, referring to FIG. 11, the self-closing unit 135 may include a body 161. The body 161 may extend in the y direction.

The self-closing unit 135 may further include a fixing mechanism 162. The fixing mechanism 162 may be a hook structure, and is configured to secure the body 161 on a bottom, in the z direction, of the fixed rail 131 shown in FIG. 4.

In an assembly state shown in FIG. 4, a side of the body 161 that is away from the side wall 120a of the chamber 120 may be provided with a guidance groove 164. An extending direction of the guidance groove 164 is parallel to the y direction.

The guidance groove 164 is adapted to accommodate a moving component 163, and the moving component 163 may move in the guidance groove 164 in the y direction or the reverse direction of the y direction.

Figure 12:
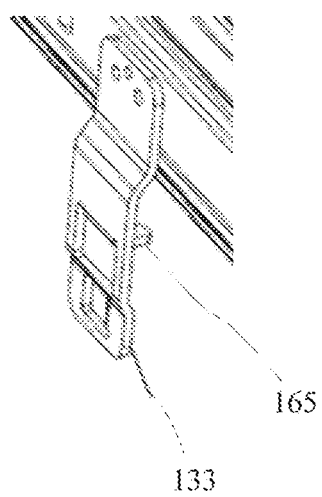
FIG. 12 is a partial enlarged view of a region B in FIG. 4.

With reference to FIG. 4, FIG. 11, and FIG. 12, a side of the hook structure 133 facing the side wall 120a of the chamber 120 in the x direction is provided with a protrusion portion 165.

When the drawer-type door 110 moves in the y direction to close the chamber 120, after the drawer-type door 110 and the movable rail 132 move toward the chamber 120 over a stroke, the protrusion portion 165 on the hook structure 133 slides into the guidance groove 164, and is engaged with the moving component 163 that is currently located at a point C in the guidance groove 164. When the protrusion portion 165 is engaged with the moving component 163, the moving component 163 may produce force in the y direction, to pull the movable rail 132 to continue moving in the y direction until the drawer-type door 110 closes the chamber 120. Therefore, the drawer-type door 110 may be closed by itself.

When the drawer-type door 110 moves in the reverse direction of the y direction to open the chamber 120, the protrusion portion 165 and the moving component 163 that are in an engagement state synchronously move to the point C in the reverse direction of the y direction with the movable rail 132. At the point C, a movable stroke of the moving component 163 in the reverse direction of the y direction reaches a limitation. As the movable rail 132 continues moving in the reverse direction of the y direction, the moving component 163 is separated from the protrusion portion 165, so that the drawer-type door 110 can further move in the reverse direction of the y direction to open the chamber 120.

In an embodiment, in the z direction, a lower end surface of the self-closing unit 135 may be flush with a lower end surface of a stop portion 155 of the limiting member 153. Moreover, in the y direction, the limiting member 153 is located in front of the self-closing unit 135. Therefore, during the second half stroke of opening, by the drawer-type door 110, the chamber 120 and the first half stroke of closing the chamber 120, the bendable member 141 may be guided and limited by the limiting member 153. During the first half stroke of opening, by the drawer-type door 110, the chamber 120 and the second half stroke of closing the chamber 120, the bendable member 141 may be guided and limited by the self-closing unit 135, thereby reducing an extending distance of the limiting member 153 in the y direction, so as to reduce manufacturing costs.

Figure 6:
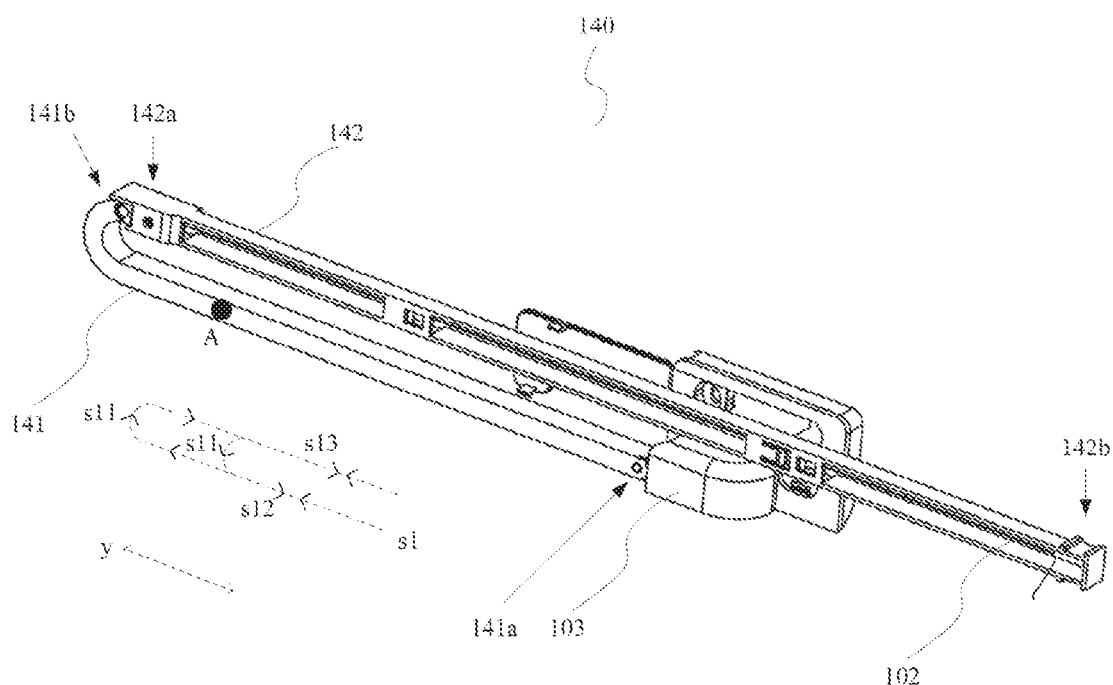
FIG. 6 is a schematic diagram of a guidance mechanism shown in FIG. 2 and FIG. 3.

Further, referring to FIG. 6, the household appliance 100 in this embodiment may further include a cable 102. The cable 102 is led from the main body 101 to the drawer-type door 110.

For example, one end of the cable 102 may be electrically connected to a power supply module (not shown in the figure) disposed on the main body 101, and the other end of the cable 102 is electrically connected to an electrically powered component (not shown in the figure) disposed on the drawer-type door 110. Therefore, power may be supplied to the electrically powered component disposed on the drawer-type door 110 by using the cable 102.

Further, referring to FIG. 2, FIG. 3, and FIG. 6, to protect and guide the cable 102, the household appliance 100 in this embodiment may further include a guidance mechanism 140. The guidance mechanism 140 is adapted to move with the drawer-type door 110, the guidance mechanism 140 includes a bendable member 141, and the bendable member 141 is adapted to move along a moving path s1 including a bent portion s11. For clearer presentation of component structures, neither FIG. 2 nor FIG. 3 shows the cable 102.

Figure 7:
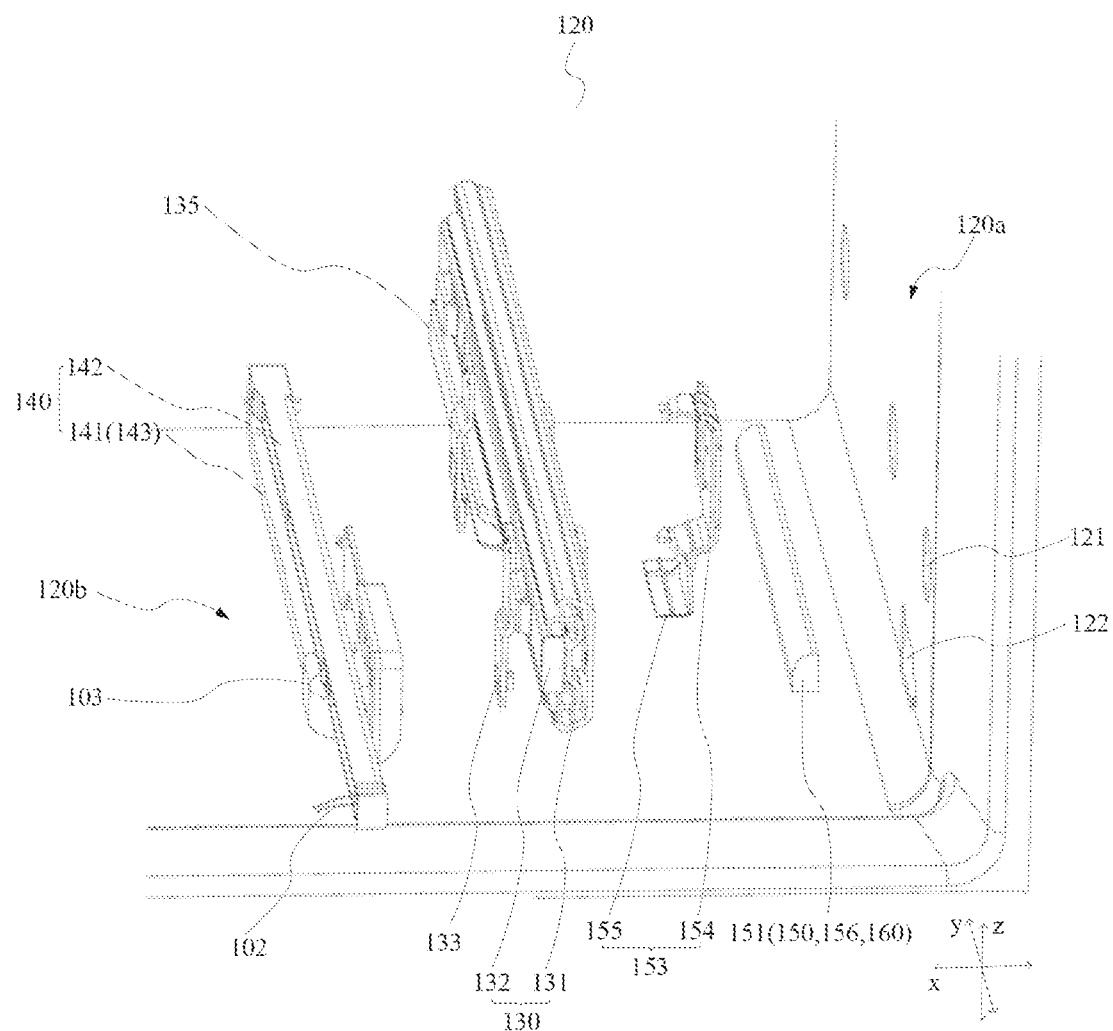
FIG. 7 is an exploded view of FIG. 3.

Further, the household appliance 100 may further include a cable exit portion 103. The cable exit portion 103 is located in a side wall (such as the side wall 120a shown in FIG. 2 and FIG. 3) of the chamber 120. For example, for overall aesthetics, a part of the cable 102 that is led out from the power supply module of the main body 101 may be arranged along an inner container (not shown in the figure) of the main body 101, and is led out from a hole 122 (as shown in FIG. 7) of the inner container that is on the side wall 120a of the chamber 120. Then, the led cable 102 is guided by the guidance mechanism 140 and is connected to the drawer-type door 110. Further, the cable exit portion 103 is adapted to cover the hole 122, on the side wall 120a, that is passed through by the cable 102 for protection.

In an embodiment, the cable exit portion 103 is connected to one end of the guidance mechanism 140, to be passed through by the cable 102. For example, the cable exit portion 103 and the guidance mechanism 140 may be integrally formed.

In an embodiment, the cable exit portion 103 may be secured on the side wall 120a of the chamber 120 by using a screw.

In an embodiment, the bendable member 141 may be a flexible component, such as a chain (also referred to as a drag chain or a tank chain). The guidance mechanism 140 may further include a rigid component 142. A first end 141a of the bendable member 141 is connected to the cable exit portion 103. A second end 141b of the bendable member 141 is connected to a first end 142a of the rigid component 142. A second end 142b of the rigid component 142 is connected to the support mechanism 130 (such as the movable rail 132). As a chain, the bendable member 141 and the cable 102 accommodated in the bendable member 141 can flexibly move by using the bent portion s11.

Therefore, when the drawer-type door 110 moves in the reverse direction of the y direction, the rigid component 142 performs straight reciprocating movement in the y direction with the movable rail 132 of the drawer-type door 110. The bendable member 141 is dragged by the rigid component 142 to perform U-shaped reciprocating movement. A moving path of the U-shaped reciprocating movement is the foregoing moving path s1.

Further, the moving path s1 may include: a first path s12 extending backward from the cable exit portion 103 (that is, toward the y direction shown in the figure or a direction pointed from the exterior of the chamber 120 to the interior of the chamber 120), a second path s13 spaced at an interval with the first path s12 in a height direction (that is, the z direction) of the chamber 120, and the bent portion s11 connecting the first path s12 to the second path s13. The first path s12 is parallel to the second path s13.

The first end 141a of the bendable member 141 is fixedly secured on the cable exit portion 103, and the second end 141b of the bendable member 141 may move as the rigid component 142 moves.

Using any point (such as a point A shown in FIG. 6) other than the first end 141a and the second end 141b on the bendable member 141 as an example, when the rigid component 142 performs the straight movement with the drawer-type door 110 in the reverse direction of the y direction (that is, a direction away from the chamber 120), the second end 141b of the bendable member 141 that is connected to the rigid component 142 also moves in the reverse direction of the y direction after dragged by the rigid component 142. In this case, the point A moves along the first path s12, the bent portion s11, and the second path s13.

Correspondingly, when the rigid component 142 performs the straight movement with the drawer-type door 110 in the y direction (that is, a direction close to the chamber 120), the second end 141b of the bendable member 141 that is connected to the rigid component 142 also moves in the y direction after dragged by the rigid component 142. In this case, the point A moves along the second path s13, the bent portion s11, and the first path s12.

In an embodiment, referring to FIG. 3, the rigid component 142 may be secured on the hook structure 133 of the support mechanism 130. For example, the rigid component 142 may be connected to the movable rail 132 by using the hook structure 133, to enable the rigid component 142 to synchronously move with the movable rail 132.

In an actual application, for better guiding and protecting, the bendable member 141 may be in a hollow structure to be passed through by the cable 102. Because hardness of the cable 102 is relatively large, and a bendable degree is relatively small, when the bendable member 141 moves along the moving path s1, the cable 102 wrapped in the bendable member 141 may drive the bendable member 141 to generate displacements upward (that is, the z direction) and/or in left and right direction (that is, the x direction and a reverse direction of the x direction). When the bendable member 141 including the cable 102 moves in the y direction and the reverse direction of the y direction, the upward displacement of the bendable member 141 is highly possible to cause a friction between the bendable member 141 and the support mechanism 130, the left and right displacements of the bendable member 141 may be is highly possible to cause a friction between the bendable member 141 and a stored object or drawer in the chamber 120. Therefore, the bendable member 141 is worn, reducing a service life of a component.

Therefore, in this embodiment, referring to FIG. 2 to FIG. 7, the household appliance 100 may further include: a limiting mechanism 150, configured to limit the bendable member 141 to move within the moving path s1 and a preset error range.

Therefore, a structure of a component surrounding the guidance mechanism 140 in the household appliance 100 is improved, for example, the limiting mechanism 150 is added, so that a moving track of the guidance mechanism 140 can be guided and limited when the guidance mechanism 140 moves with the drawer-type door 110. This helps the guidance mechanism 140 and the cable 102 move along an expected track, so as to achieve an actual design effect and an expected service life.

Specifically, the limiting mechanism 150 is adapted to abut against at least one side of the bendable member 141 when the bendable member 141 moves, to limit and guide the bendable member 141 to always move along the moving path s1.

In an embodiment, the limiting mechanism 150 is fixedly secured in the chamber 120, to provide better limiting and guidance, and prevent the limiting mechanism 150 from moving as the guidance mechanism 140 moves.

In an embodiment, referring to FIG. 2, FIG. 3, FIG. 7, and FIG. 8, the limiting mechanism 150 may include: a first limiting portion 156, configured to limit deviation of the bendable member 141 from the moving path s1 in a width direction (that is, the x direction) of the chamber 120 when the bendable member 141 moves.

Specifically, the first limiting portion 156 may extend along the first path s12, so as to limit and guide the bendable member 141 to move along the first path s12 through limiting and guiding of the first limiting portion 156 when the guidance mechanism 140 moves with the drawer-type door 110.

Further, the first limiting portion 156 and the first path s12 are distributed in parallel in the width direction (that is, the x direction) of the chamber 120, so that a moving track of the bendable member 141 in the x direction is limited and guided.

In an embodiment, the first limiting portion 156 is fixedly secured on a bottom wall 120b of the chamber 120, and is close to a side of the bendable member 141 that is away from the side wall 120a of the chamber 120, to limit the movement of the bendable member 141 in the x direction.

For example, referring to FIG. 2 to FIG. 4 and FIG. 7, the first limiting portion 156 may include a projecting rib 151. The projecting rib 151 protrudes upward from the bottom wall 120b of the chamber 120 in the z direction and extends along the moving path s1 (such as the first path s12 shown in the figure). Therefore, the moving path s1 of the bendable member 141 may be guided and limited by using an existing component of the household appliance 100 and finely adjusting a location of the projecting rib 151 in the chamber 120.

Specifically, in the x direction, the projecting rib 151 may abut against the side of the bendable member 141 that is away from the side wall 120a of the chamber 120.

Alternatively, in the x direction, the projecting rib 151 and the side of the bendable member 141 that is away from the side wall 120a of the chamber 120 may have a gap of 1 mm to 2 mm, to limit the moving path s1 of the bendable member 141 in an acceptable preset error range, thereby avoiding damage to the bendable member 141 due to frequent friction.

When the household appliance 100 is a refrigerator, the projecting rib 151 may be integrally formed with an inner container component of the refrigerator.

Alternatively, the projecting rib 151 may be an extra mounted component, and is secured at a suitable location of the bottom wall 120b of the chamber 120 in a manner such as bonding, or securing with a screw.

Figure 8:
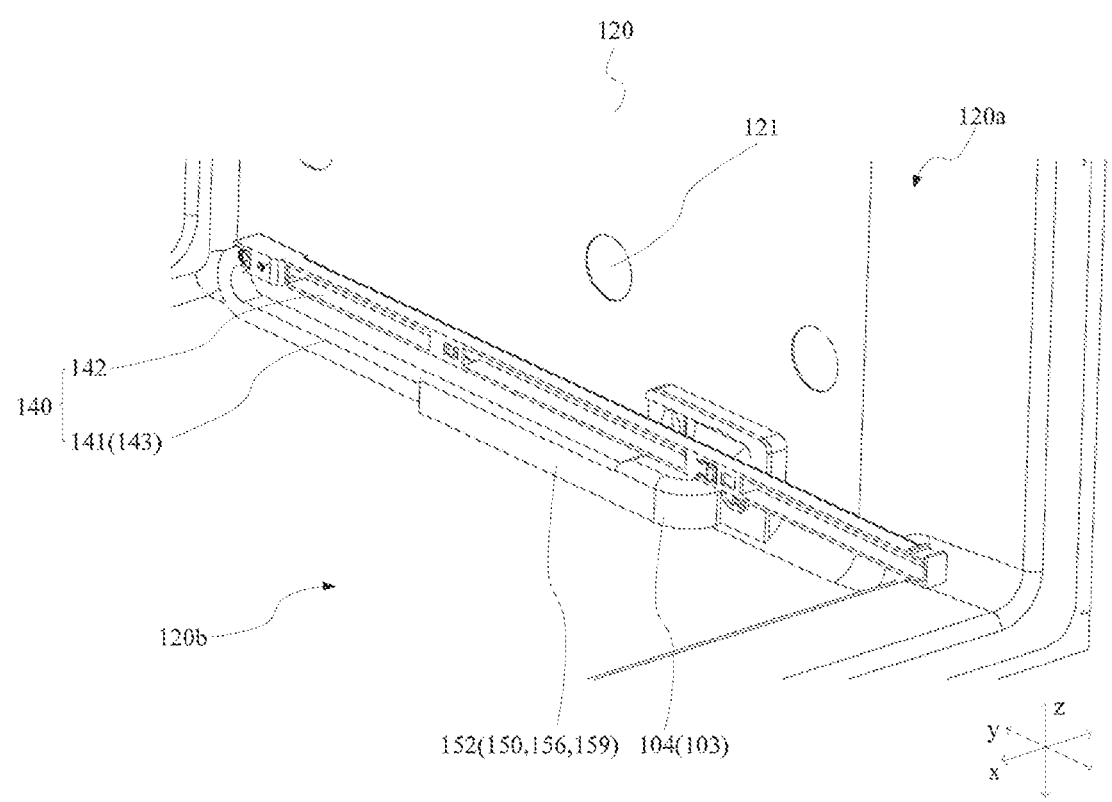
FIG. 8 is a schematic diagram of a combination of a limiting mechanism in a chamber according to an embodiment of the present invention.

For another example, referring to FIG. 8, the household appliance 100 may further include a cable housing 104. The cable housing 104 is connected to a wall (such as the side wall 120a shown in the figure) of the chamber 120, and the cable 102 is led out from the cable housing 104. For a specific function and structure of the cable housing 104, refer to the foregoing related descriptions of the cable exit portion 103.

Further, in this example, the first limiting portion 156 may include a limiting bar 152. The limiting bar 152 extends backward from the cable housing 104 (that is, the y direction shown in the figure) along the moving path s1 (such as the first path s12 shown in the figure). Therefore, the moving path s1 of the bendable member 141 may be guided and limited by using an existing component of the household appliance 100 and improving a structure of the cable housing 104 through addition of the limiting bar 152.

Specifically, the limiting bar 152 and the cable housing 104 may be integrally formed, to improve overall hardness and provide better limiting and guidance effects.

More specifically, a function of the limiting bar 152 is similar to that of the projecting rib 151, and both the limiting bar 152 and the projecting rib 151 are configured to limit and guide the bendable member 141 to move within the first path s12 and the preset error range.

Further, the first limiting portion 156, which takes the projecting rib 151 and the limiting bar 152 as examples, is strip-shaped, and a length of the first limiting portion 156 along the first path s12 is not less than a half length of the first path s12, so as to ensure that the bendable member 141 can be continuously guided and limited when moving with the drawer-type door 110.

In an embodiment, the limiting bar 152 and the projecting rib 151 may be alternatively disposed in the chamber 120. Further, in the y direction, a length of the limiting bar 152 or the projecting rib 151 is not less than a half length of the bendable member 141, so as to ensure relatively good limiting and guidance in the whole movement of the bendable member 141.

Alternatively, the limiting bar 152 and the projecting rib 151 may be disposed in the chamber 120 together, and a sum of lengths of the limiting bar 152 and the projecting rib 151 in they direction is not less than the half length of the bendable member 141.

Further, when the limiting bar 152 and the projecting rib 151 may be disposed in the chamber 120 together, the limiting bar 152 may extend backward from the cable housing 104, and the projecting rib 151 may extend outward from the interior of the chamber 120, so as to perform limiting and guidance in the whole movement of the bendable member 141 along the first path s12.

Further, the limiting bar 152 and/or the projecting rib 151 are adapted to limit a displacement of the bendable member 141 in the x direction, so as to perform guidance.

In an embodiment, referring to FIG. 2, FIG. 3, FIG. 7, FIG. 9, and FIG. 10, the limiting mechanism 150 may include: a second limiting portion 157, configured to limit deviation of the bendable member 141 from the moving path s1 in a height direction (that is, the z direction) of the chamber 120 when the bendable member 141 moves. Therefore, through limiting and guiding of the first limiting portion 156 and/or the second limiting portion 157, the bendable member 141 can be limited to move within the moving path s1 and the preset error range in the width direction (that is, the x direction) and the height direction (that is, the z direction) in an omnidirectional manner.

Specifically, the second limiting portion 157 may extend along the second path s13, so as to limit and guide the bendable member 141 to move along the second path s13 through limiting and guiding of the second limiting portion 157 when the guidance mechanism 140 moves with the drawer-type door 110.

Further, in the height direction (that is, the z direction) of the chamber 120, the second limiting portion 157 is located above the second path s13, so that a moving track of the bendable member 141 in the height direction (that is, the z direction) of the chamber 120 is limited and guided.

For example, the limiting mechanism 150 may include a limiting member 153 connected to the support mechanism 130. Therefore, the moving path s1 of the bendable member 141 is guided and limited by adding the limiting member 153 to the support mechanism 130. Moreover, a manner in which the limiting member 153 is disposed on the support mechanism 130 helps reduce assembly complexity, so that there is no need to punch another hole in an inner wall (such as the side wall 120a) of the chamber 120, so as to avoid damage to the interior of the chamber 120.

Specifically, the limiting member 153 is adapted to limit a displacement of the bendable member 141 in the z direction, so as to perform guidance. Further, the limiting member 153 is configured to limit and guide the bendable member 141 to move along the bent portion s11 and within the second path s13 and a preset error range thereof.

Further, the limiting member 153 may be connected to the fixed rail 131. Therefore, when the guidance mechanism 140 moves with the drawer-type door 110, the limiting member 153 secured on the fixed rail 131 may not move as the drawer-type door 110 moves, so as to continuously and effectively implement functions of guiding and limiting.

Figure 10:
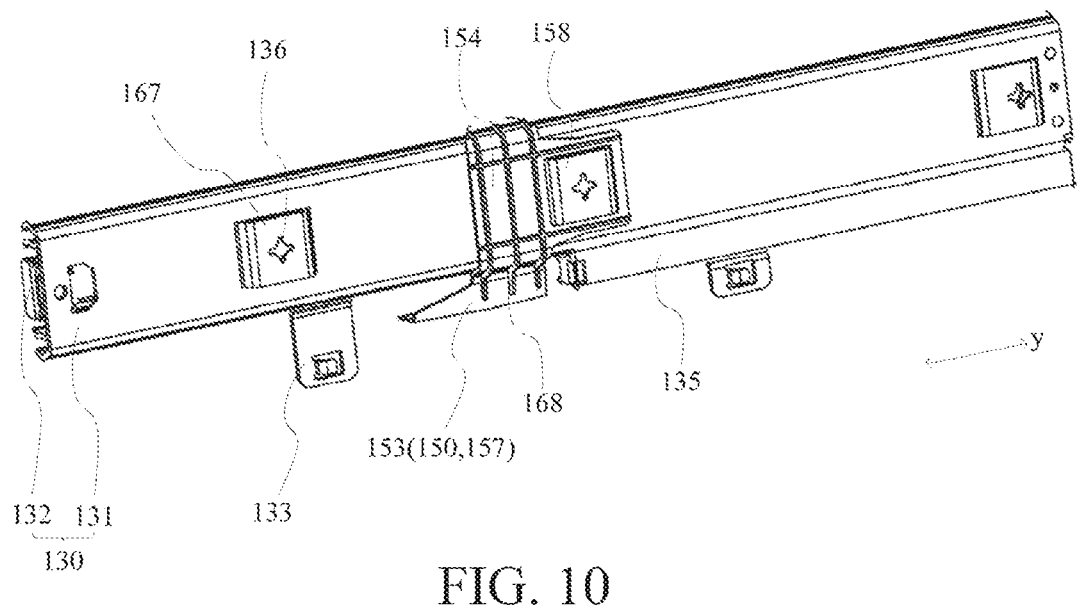
FIG. 10 is a schematic diagram of a combination of the limiting mechanism illustrated in FIG. 9 and the support mechanism shown in FIG. 3.

Further, referring to FIG. 3, FIG. 7, and FIG. 10, the limiting member 153 may be located between the fixed rail 131 and a wall (such as the side wall 120a shown in the figure) of the chamber 120, to rationally use a space structure in the chamber 120, and prevent the limiting member 153 exposed outside from occupying storage space in the chamber 120.

Figure 9:
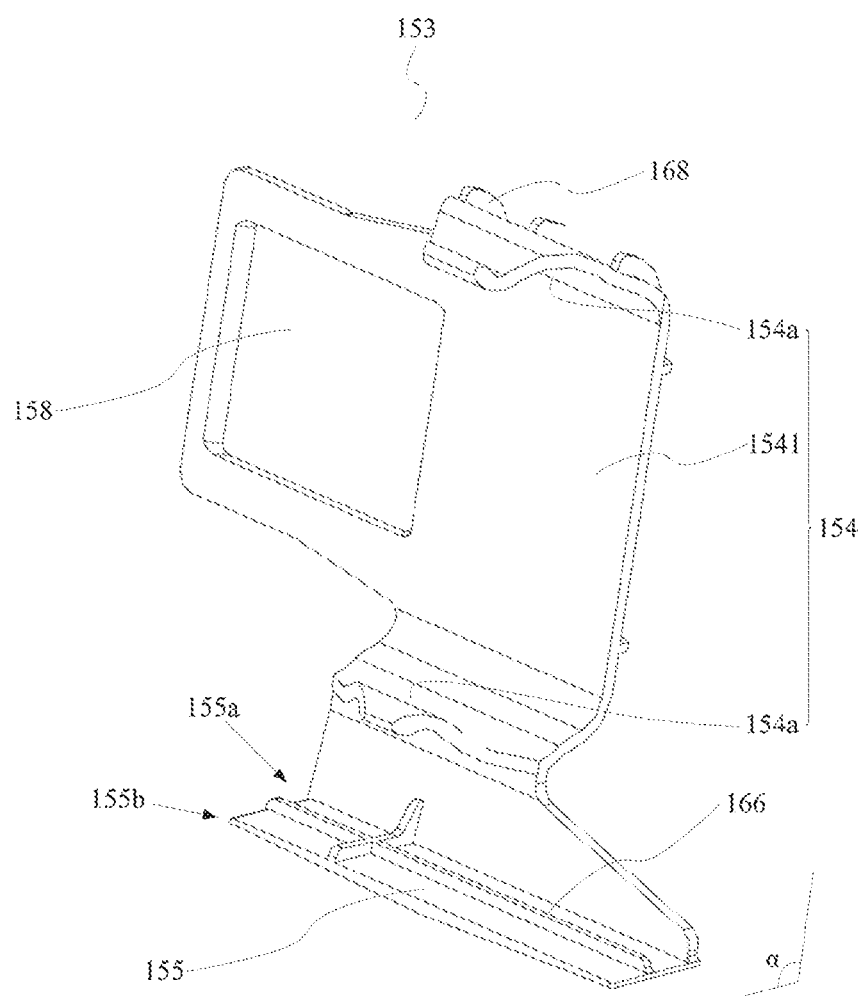
FIG. 9 is a schematic diagram of another limiting mechanism according to an embodiment of the present invention.

In an embodiment, with reference to FIG. 9, the limiting member 153 may include a mounting portion 154 secured on the fixed rail 131. The mounting portion 154 may include a main body portion 1541 extending along an inner side of the fixed rail 131 facing an inner wall (such as the side wall 120a shown in the figure) of the chamber 120.

The limiting member 153 may further include a stop portion 155 located below the fixed rail 131. The stop portion 155 is configured to limit a moving range of the bendable member 141. An included angle α of a preset angle may be formed between the stop portion 155 and the mounting portion 154.

The stop portion 155 may have a first end 155a and a second end 155b opposite to each other. The first end 155a is connected to the mounting portion 154, and the second end 155b extends in a direction that is away from the inner wall (such as the side wall 120a shown in the figure) of the chamber 120. The stop portion 155 may include a sheet-like body that is substantially plate-shaped and that is parallel to a horizontal plane. The stop portion 155 may be provided with a reinforcing rib 166 in a surface away from the bendable member 141. When the limiting member 153 and the fixed rail 131 are combined and mounted in the chamber 120, the horizontal plane refers to a plane that is formed in the x direction and the y direction of the chamber 120.

Therefore, the limiting member 153 is firmly secured on the fixed rail 131 of the support mechanism 130 by using the mounting portion 154, so that the moving path s1 of the bendable member 141 is guided and limited by using the stop portion 155. Further, through coordination of the mounting portion 154 and the stop portion 155, it can effectively avoid that limiting and guiding effects are affected because the limiting member 153 moves with the bendable member 141 when limited and guided.

The mounting portion 154 may have a pair of claw structures 154a respectively connected to upper and lower ends of the main body portion 1541. The claw structures 154a may have shapes that fit corresponding outer profile parts of the fixed rail 131. The limiting member 153 may be engaged on a side of the fixed rail 131 facing the side wall 120a of the chamber 120 by using the claw structures 154a. Specifically, the mounting portion 154 that is substantially C-shaped is engaged on upper and lower surfaces of the fixed rail 131 by using the claw structures 154a. Therefore, when the fixed rail 131 is secured on the side wall 120a of the chamber 120, most structure of the limiting member 153 is invisible to outside. This helps ensure an artistic structure in the interior of the chamber 120.

Further, referring to FIG. 2, FIG. 9, and FIG. 10, to enable the limiting member 153 to be positioned to the fixed rail 131 more reliably, the main body portion 1541 may be provided with a limiting hole 158 that is adaptive to a coupling portion 167 of the fixed rail 131. The coupling portion 167 may be provided with a via 136. After the limiting member 153 is secured on the fixed rail 131, when the fixed rail 131 is assembled on the side wall 120a of the chamber 120, a screw may pass through the limiting hole 158 in the main body portion 1541 and the via 136 in the fixed rail 131 and the fixing hole 121 in the side wall 120a, to secure the fixed rail 131 on the side wall 120a. Therefore, when the limiting member 153 is engaged on the fixed rail 131 by using the claw structures 154a, the limiting member 153 may be pressed tightly between the fixed rail 131 and the side wall 120a of the chamber 120 by using the screw that is configured to secure the fixed rail 131 on the side wall 120a of the chamber 120, thereby avoiding an unexpected displacement of the limiting member 153 when the limiting member 153 limits and guides the bendable member 141. A side of the main body portion 1541 facing the side wall 120a may be provided with at least one pair of projections 168. The projection 168 abuts against the side wall 120a.

Therefore, when the bendable member 141 moves in the reverse direction of the y direction, it can be effectively ensured that the limiting member 153 that abut against the bendable member 141 to perform limiting and guiding generates a displacement in the reverse direction of the y direction with the bendable member 141.

Further, the mounting portion 154 may alternatively be secured on the fixed rail 131 by using another screw or in another securing manner, to improve mounting strength.

Further, the preset angle of the included angle α may be selected from an angle range of 80° to 100°. Preferred, the preset angle of the included angle α may be 90°. Therefore, when the bendable member 141 moves, it is ensured that the stop portion 155 and the bendable member 141 may have a relatively large contact area by forming the limiting member 153 similar to an L-shaped structure, that is, an extending direction of the stop portion 155 may be parallel to the plane formed in the x direction and the y direction, thereby dispersing force-bearing points and prolonging a service life of a component.

Further, in the z direction, a height from the stop portion 155 to the bottom wall 120b of the chamber 120 may be set as follows: when the rigid component 142 is located below the stop portion 155 in the z direction, there is a gap between the two components; and when the drawer-type door 110 moves in the reverse direction of the y direction to a location at which the bendable member 141 is located below the stop portion 155 in the z direction, the bendable member 141 abuts against the stop portion 155, to avoid that the limiting member 153 is worn due to frequent friction between the limiting member 153 and the rigid component 142 that does not have limiting and guiding requirements, thereby prolonging a service life of the limiting member 153.

In a typical application scenario, referring to FIG. 1, FIG. 2, FIG. 3, FIG. 5 to FIG. 7, FIG. 9 and FIG. 10, a household appliance 100 may include: a main body 101, including a chamber 120 with an opening 105; a drawer-type door 110 configured to close or open the chamber 120; a support mechanism 130, connected between the drawer-type door 110 and the main body 101, so that the drawer-type door 110 is movably connected to the main body 101; a cable 102, where the cable 102 is led from the main body 101 to the drawer-type door 110; a chain 143, configured to guide the cable 102; and a limiting member 153, where the limiting member 153 is connected to the support mechanism 130, and the limiting member 153 is configured to limit a moving range of the chain 143. Therefore, when the chain 143 moves with the drawer-type door 110, the moving range of the chain 143 in a height direction (that is, a z direction) of the chamber 120 is limited by adding the limiting member 153 to the support mechanism 130. Moreover, a manner in which the limiting member 153 is disposed on the support mechanism 130 helps reduce assembly complexity, so that there is no need to punch another hole in an inner wall of the chamber 120, so as to avoid damage to the interior of the chamber 120.

For a specific structure of the chain 143, refer to the related descriptions of the bendable member 141 of the guidance mechanism 140 in the foregoing embodiments. Details are omitted herein.

Further, the chain 143 may include a plurality of unit links (not shown in the figure), and flexible bending may be implemented between adjacent unit links.

Further, the support mechanism 130 may include a fixed rail 131 fixedly secured on the main body 101, and the limiting member 153 is connected to the fixed rail 131. Therefore, when the chain 143 moves with the drawer-type door 110, the limiting member 153 secured on the fixed rail 131 may continuously and effectively implement functions of guiding and limiting.

Further, referring to FIG. 11, the household appliance 100 may include a self-closing unit 135 secured on the fixed rail 131. In a reverse direction of a y direction, the limiting member 153 is located in front of the self-closing unit 135. The front refers to a location that is closer to the opening 105 of the chamber 120 than the self-closing unit 135 in a depth direction of the chamber 120. Therefore, based on original mounting locations of existing components in the chamber 120, space in the chamber 120 is rationally used to design a mounting location of the limiting member 153, so as to obtain both artistic and guiding effects.

Further, the limiting member 153 may include: a mounting portion 154, secured on a side of the fixed rail 131 that is close to an inner wall (such as a side wall 120a) of the chamber 120; and a stop portion 155, having an included angle α of a preset angle with the mounting portion 154. The stop portion 155 has a first end 155a and a second end 155b opposite to each other. The first end 155a is connected to the mounting portion 154, and the second end 155b extends in a direction that is away from the inner wall (such as the side wall 120a) of the chamber 120. Therefore, the limiting member 153 is firmly secured on the fixed rail 131 of the support mechanism 130 by using the mounting portion 154, so that the moving path of the chain 143 is guided and limited by using the stop portion 155. Further, through coordination of the mounting portion 154 and the stop portion 155, it can effectively avoid that limiting and guiding effects are affected because the limiting member 153 moves with the chain 143 when limited and guided.

In another typical application scenario, referring to FIG. 8, a household appliance 100 may include: a main body 101, including a chamber 120 with an opening 105; a drawer-type door 110 configured to close or open the chamber 120; a support mechanism 130, connected between the drawer-type door 110 and the main body 101, so that the drawer-type door 110 is movably connected to the main body 101; a cable 102, where the cable 102 is led from a cable housing 104 secured on the main body 101 to the drawer-type door 110; and a chain 143 configured to guide the cable 102. The cable housing 104 may include a guiding portion 159, and the guiding portion 159 extends along the chain 143. Therefore, when the chain moves with the drawer-type door 110, a moving range of the chain 143 in a width direction (that is an x direction) of the chamber 120 may be limited by using an existing component of the household appliance 100 and improving a structure of the cable housing 104 through addition of the guiding portion.

For a specific structure of the chain 143, refer to the related descriptions of the bendable member 141 of the guidance mechanism 140 in the foregoing embodiments. Details are omitted herein.

For a specific structure of the guiding portion 159, refer to the related descriptions of the limiting bar 152 in the foregoing embodiments. Details are omitted herein.

In still another typical application scenario, referring to FIG. 2, FIG. 3, and FIG. 7, a household appliance 100 may include: a main body 101, including a chamber 120 with an opening 105; a drawer-type door 110 configured to close or open the chamber 120; a support mechanism 130, connected between the drawer-type door 110 and the main body 101, so that the drawer-type door 110 is movably connected to the main body 101; a cable 102, where the cable 102 is led from a cable housing 104 secured on the main body 101 to the drawer-type door 110; and a chain 143 configured to guide the cable 102. An inner wall (such as a bottom wall 120b) of the chamber 120 has a projecting portion 160 close to the chain, and the projecting portion 160 extends along the chain 143. Therefore, when the chain 143 moves with the drawer-type door 110, a moving range of the chain 143 in a width direction (that is, an x direction) of the chamber 120 may be limited by using the projecting portion 160.

For a specific structure of the chain 143, refer to the related descriptions of the bendable member 141 of the guidance mechanism 140 in the foregoing embodiments. Details are omitted herein.

For a specific structure of the projecting portion 160, refer to the related descriptions of the projecting rib 151 in the foregoing embodiments. Details are omitted herein.

Based on the above, by using the solution in this embodiment, a displacement of the bendable member 141 in the width direction (that is, the x direction) of the chamber 120 may be limited based on a first limiting portion 156, so as to perform guiding.

Further, a displacement of the bendable member 141 in a height direction (that is, a z direction) of the chamber 120 may be limited based on a second limiting portion 157, so as to perform guiding.

In a typical application scenario, the first limiting portion 156 and the second limiting portion 157 may alternatively be disposed in the chamber 120, to limit and guide a displacement of the bendable member 141 in a specific direction in the chamber 120.

In another typical application scenario, for better limiting and guiding, the first limiting portion 156 and the second limiting portion 157 may be disposed in the chamber 120 together, to limit and guide a displacement of the bendable member 141 in the chamber 120 in an omnidirectional manner. This helps the bendable member 141 to move along a moving path s1.

Although the present invention is disclosed above, the present invention is not limited to this. A person skilled in the art can make various variations and modifications without departing from the spirit and scope of the present invention. Therefore, the protection scope of the present invention shall be subject to a scope defined by the claims.

The following is a list of reference numerals and components used in the above description of the invention with reference to the drawing figures:

100 Household appliance
101 Main body
102 Cable
103 Cable exit portion
104 Cable housing
105 Opening
110 Drawer-type door, drawer door
120 Chamber
120a Side wall
120b Bottom wall
121 Fixing hole
122 Hole
130 Support mechanism
131 Fixed rail
132 Movable rail
133 Hook structure
134 Support frame
135 Self closing unit
136 Via
137 Hook portion
138 Adaptive portion
139 Rail
140 Guidance mechanism
141 Bendable member
141a First end of the bendable member
141b Second end of the bendable member
142 Rigid component
142a First end of the rigid component
142b Second end of the rigid component
143 Chain
150 Limiting mechanism
151 Projecting rib
152 Limiting bar
153 Limiting member
154 Mounting portion
154a Claw structure
1541 Main body portion
155 Stop portion
155a First end of the stop portion
155b Second end of the stop portion
156 First limiting portion
157 Second limiting portion
158 Limiting hole
159 Guiding portion
160 Projecting portion
161 Body
162 Fixing mechanism
163 Moving component
164 Guidance groove
165 Protrusion portion
166 Reinforcing rib
167 Coupling portion
168 Projection
s1 Moving path
s11 Bent portion
s12 First path
s13 Second path
α Included angle.

The invention claimed is:

1. A household appliance, comprising:
a main body formed with a chamber having an opening;
a drawer door configured to selectively close or open said chamber;
a support mechanism, connected between said drawer door and said main body and movably connecting said drawer door to said main body;
a cable extending between said main body and said drawer door;
a guidance mechanism configured to guide said cable, said guidance mechanism being configured to move with said drawer door and including a bendable member, said bendable member being configured to move along a moving path having a bent portion;
a cable exit portion located on a side wall of said chamber;
a limiting mechanism configured to limit said bendable member to move within the moving path and a preset error range;
the moving path including a first path extending backward from the cable exit portion, a second path extending parallel to the second path and spaced at an interval with the first path in a height direction of said chamber, and said bent portion connecting the first path to the second path;
said limiting mechanism including a first limiting portion extending along the first path or a second limiting portion extending along the second path; and
said cable exit portion having a cable housing, wherein said cable is led out from said cable housing, and said first limiting portion extends backward from said cable housing.

2. The household appliance according to claim 1, wherein:
said limiting mechanism is fixedly secured in said chamber; and/or
said limiting mechanism comprises a projecting rib protruding from a bottom wall of said chamber and extending along the moving path.

3. The household appliance according to claim 1, further comprising a cable housing connected to a wall of said chamber, said cable issuing from said cable housing, and said limiting mechanism comprising a limiting bar, extending backward from said cable housing along the moving path.

4. The household appliance according to claim 1, wherein said limiting mechanism comprises a limiting member connected to said support mechanism.

5. The household appliance according to claim 4, wherein said support mechanism comprises a fixed rail fixedly secured on said main body, and said limiting member is connected to said fixed rail.

6. The household appliance according to claim 5, wherein:
said limiting member is located between said fixed rail and a wall of said chamber; and/or
said limiting member comprises:
a mounting portion, secured on a side of said fixed rail that is close to an inner wall of said chamber; and
a stop portion, having an included angle of a preset angle with said mounting portion, wherein said stop portion has a first end and an opposite second end, said first end being connected to said mounting portion, and said second end extending in a direction away from said inner wall of said chamber.

7. The household appliance according to claim 1, wherein said limiting mechanism comprises:
a first limiting portion configured to limit a deviation of said bendable member from the moving path in a width direction of said chamber when the bendable member moves; or
a second limiting portion configured to limit a deviation of said bendable member from the moving path in a height direction of said chamber when the bendable member moves.

8. The household appliance according to claim 1, wherein:
said first limiting portion and the first path are distributed in parallel in a width direction of said chamber; or
said second limiting portion is located above the second path in the height direction of said chamber.

9. The household appliance according to claim 1, wherein said first limiting portion is strip-shaped, and a length of said first limiting portion along the first path is not less than a half length of the first path.

10. The household appliance according to claim 1, wherein said support mechanism comprises a fixed rail secured on said main body, and said second limiting portion is connected to said fixed rail.

11. The household appliance according to claim 10, wherein said second limiting portion is located between said fixed rail and a wall of said chamber.

12. The household appliance according to claim 1, wherein said bendable member comprises a chain.

13. A household appliance, comprising:
a main body formed with a chamber having an opening;
a drawer door configured to selectively close or open said chamber;
a support mechanism, connected between said drawer door and said main body and movably connecting said drawer door to said main body;
a cable extending between said main body and said drawer door;
a guidance mechanism configured to guide said cable, said guidance mechanism being configured to move with said drawer door and including a bendable member, said bendable member being configured to move along a moving path having a bent portion;
a cable exit portion located on a side wall of said chamber;
a limiting mechanism configured to limit said bendable member to move within the moving path and a preset error range;
the moving path including a first path extending backward from the cable exit portion, a second path parallel to the first path and spaced at an interval with the first path in a height direction of said chamber, and said bent portion connecting the first path to the second path; and
said limiting mechanism including a first limiting portion extending along the first path and said first limiting portion having a projecting rib formed on a bottom wall of said chamber, and said projecting rib extending along the first path.

14. A household appliance, comprising:
a main body containing a chamber with an opening;
a drawer door configured to selectively close or open said chamber;
a support mechanism disposed between said drawer door and said main body and movably connecting said drawer door to said main body;
a cable extending from said main body to said drawer door and guiding a chain of said cable;
said support mechanism having a fixed rail fixedly secured on said main body;
a limiting member connected to said fixed rail of said support mechanism, said limiting member being configured to limit a moving range of said chain, said limiting member including:
a mounting portion secured on a side of said fixed rail that is close to an inner wall of said chamber; and
a stop portion, having an included angle of a preset angle with said mounting portion, wherein said stop portion has a first end and an opposite second end, said first end is connected to said mounting portion, and said second end extends in a direction away from the inner wall of said chamber.

15. The household appliance according to claim 14, further comprising a self-closing unit secured on said fixed rail, wherein said limiting member is located in front of said self-closing unit.

16. A household appliance, comprising:
a main body containing a chamber with an opening;
a drawer door configured to selectively close or open the chamber;
a support mechanism connected between said drawer door and said main body and movably connecting said drawer door with said main body; and
a cable led from a cable housing secured on said main body to said drawer door and guiding a chain of said cable;
said cable housing including a guiding portion disposed to extend along said chain;
said support mechanism including a fixed rail fixedly secured on said main body, and a limiting member connected to said fixed rail, said limiting member being configured to limit a moving range of said chain;

wherein said limiting member comprises:

a mounting portion secured on a side of said fixed rail that is close to an inner wall of said chamber; and a stop portion, having an included angle of a preset angle with said mounting portion, wherein said stop portion has a first end and an opposite second end, said first end is connected to said mounting portion, and said second end extends in a direction away from the inner wall of said chamber.

* * * * *